(12) United States Patent
Marignan et al.

(10) Patent No.: US 8,813,149 B2
(45) Date of Patent: Aug. 19, 2014

(54) PROCESS AND SYSTEM FOR MANAGEMENT OF A CONTINUOUS BROADCAST SESSION OF A POSTED DIRECT VIDEO STREAM

(75) Inventors: Willy Marignan, Paris (FR); Guillaume Odriosolo, Paris (FR); Paul-Anatole Claudot, Porcelette (FR); Vincent Ganneau, Le Mans (FR); Antoine Cabot, Villejuif (FR)

(73) Assignee: Orange, Paris (FR)

( * ) Notice: Subject to any disclaimer, the term of this patent is extended or adjusted under 35 U.S.C. 154(b) by 0 days.

(21) Appl. No.: 13/093,140

(22) Filed: Apr. 25, 2011

(65) Prior Publication Data
US 2012/0072961 A1 Mar. 22, 2012

(30) Foreign Application Priority Data
Apr. 23, 2010 (FR) ..................... 10 53148

(51) Int. Cl.
| H04N 7/173 | (2011.01) |
| H04N 21/61 | (2011.01) |
| H04N 21/234 | (2011.01) |
| H04L 29/06 | (2006.01) |
| H04N 21/414 | (2011.01) |
| H04N 21/6437 | (2011.01) |
| H04N 21/643 | (2011.01) |

(52) U.S. Cl.
CPC ....... *H04N 7/17318* (2013.01); *H04N 21/6131* (2013.01); *H04N 21/234* (2013.01); *H04L 65/4076* (2013.01); *H04L 65/4061* (2013.01); *H04N 21/41407* (2013.01); *H04N 21/6437* (2013.01); *H04L 65/403* (2013.01); *H04N 21/64322* (2013.01)
USPC .......................................... 725/109

(58) Field of Classification Search
CPC ................................. H04N 21/4788
USPC .................................. 725/109–113
See application file for complete search history.

(56) References Cited

U.S. PATENT DOCUMENTS

| 5,808,662 A * | 9/1998 | Kinney et al. ........... 348/14.1 |
| 2003/0002849 A1 * | 1/2003 | Lord ........................ 386/46 |

(Continued)

FOREIGN PATENT DOCUMENTS

| WO | 2008/131118 A1 | 10/2008 |
| WO | 2009/038262 A1 | 3/2009 |
| WO | 2009/080345 A1 | 7/2009 |

OTHER PUBLICATIONS

French Search Report, dated Aug. 30, 2010, from corresponding French application.

*Primary Examiner* — Junior Mendoza
(74) *Attorney, Agent, or Firm* — Knobbe Martens Olson & Bear LLP

(57) ABSTRACT

A process and an associated system for management of a live streaming session posted directly on terminals connected to a communications network, the process includes stages of:
  sending invitations to the session to several invited terminals selected by a transmitting terminal;
  placing the transmitting and invited terminals in synchronized standby states depending on a predetermined synchronization duration, states during which the transmitting terminal is not transmitting the video stream to the destination of a multicast server in the session;
  when the transmitting terminal leaves its standby state to send a direct video stream to the broadcast server, allowing the invited terminals that have responded in the affirmative to the invitation to access the broadcast server to receive the continuously broadcast video stream.

11 Claims, 4 Drawing Sheets

(56) References Cited

U.S. PATENT DOCUMENTS

| | | |
|---|---|---|
| 2003/0088875 A1* | 5/2003 | Gay et al. .................. 725/88 |
| 2003/0126211 A1* | 7/2003 | Anttila et al. ............. 709/205 |
| 2003/0156827 A1* | 8/2003 | Janevski ................... 386/96 |
| 2006/0002681 A1* | 1/2006 | Spilo et al. ................ 386/46 |
| 2006/0271960 A1* | 11/2006 | Jacoby et al. ............. 725/46 |
| 2007/0283403 A1* | 12/2007 | Eklund et al. ............. 725/117 |
| 2008/0034041 A1* | 2/2008 | Kang et al. ............... 709/205 |
| 2010/0081116 A1* | 4/2010 | Barasch et al. ........... 434/252 |
| 2010/0122304 A1* | 5/2010 | Scott, III .................. 725/89 |
| 2011/0010459 A1* | 1/2011 | Stokking et al. .......... 709/231 |
| 2012/0324052 A1* | 12/2012 | Paleja et al. .............. 709/217 |

* cited by examiner

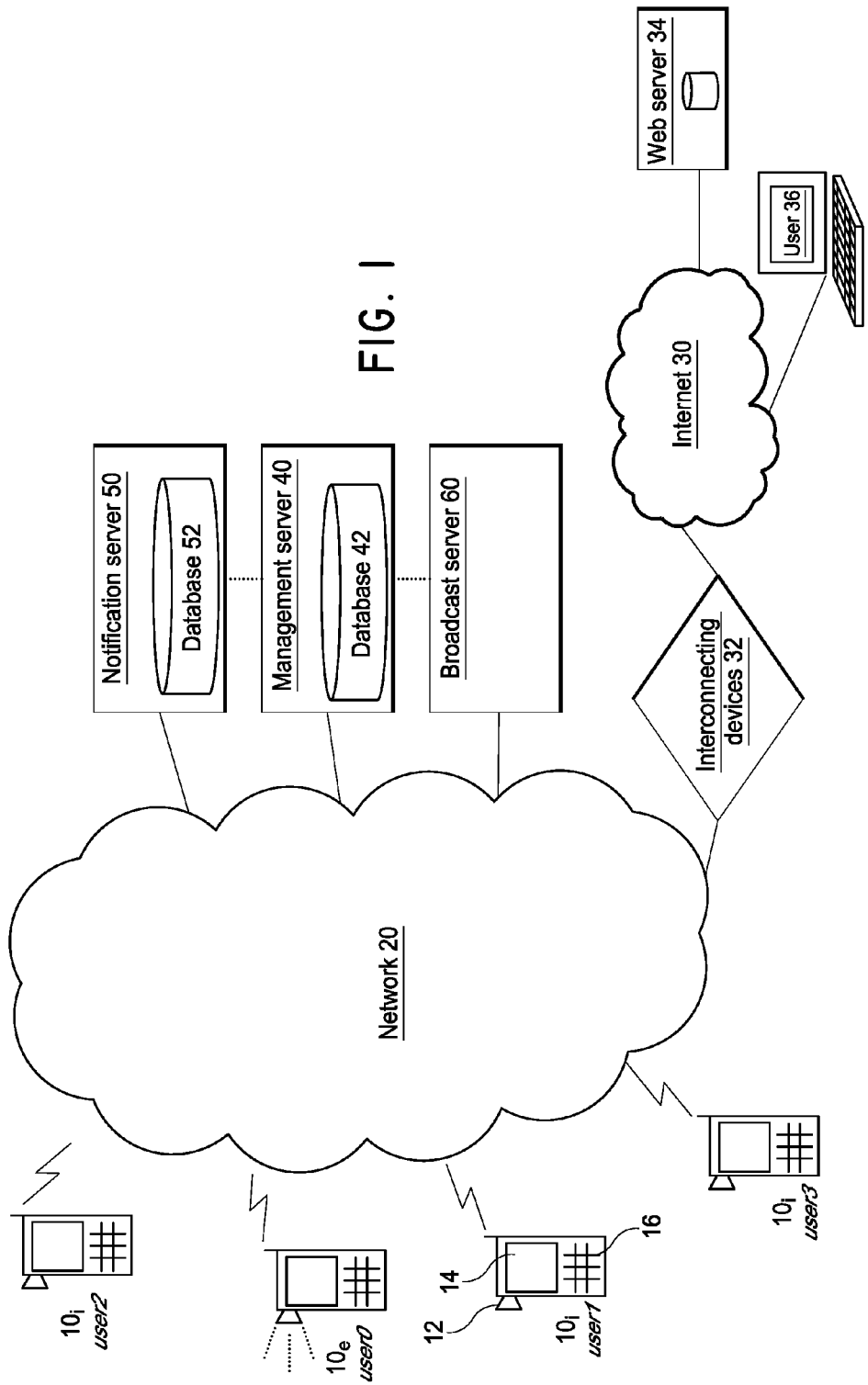

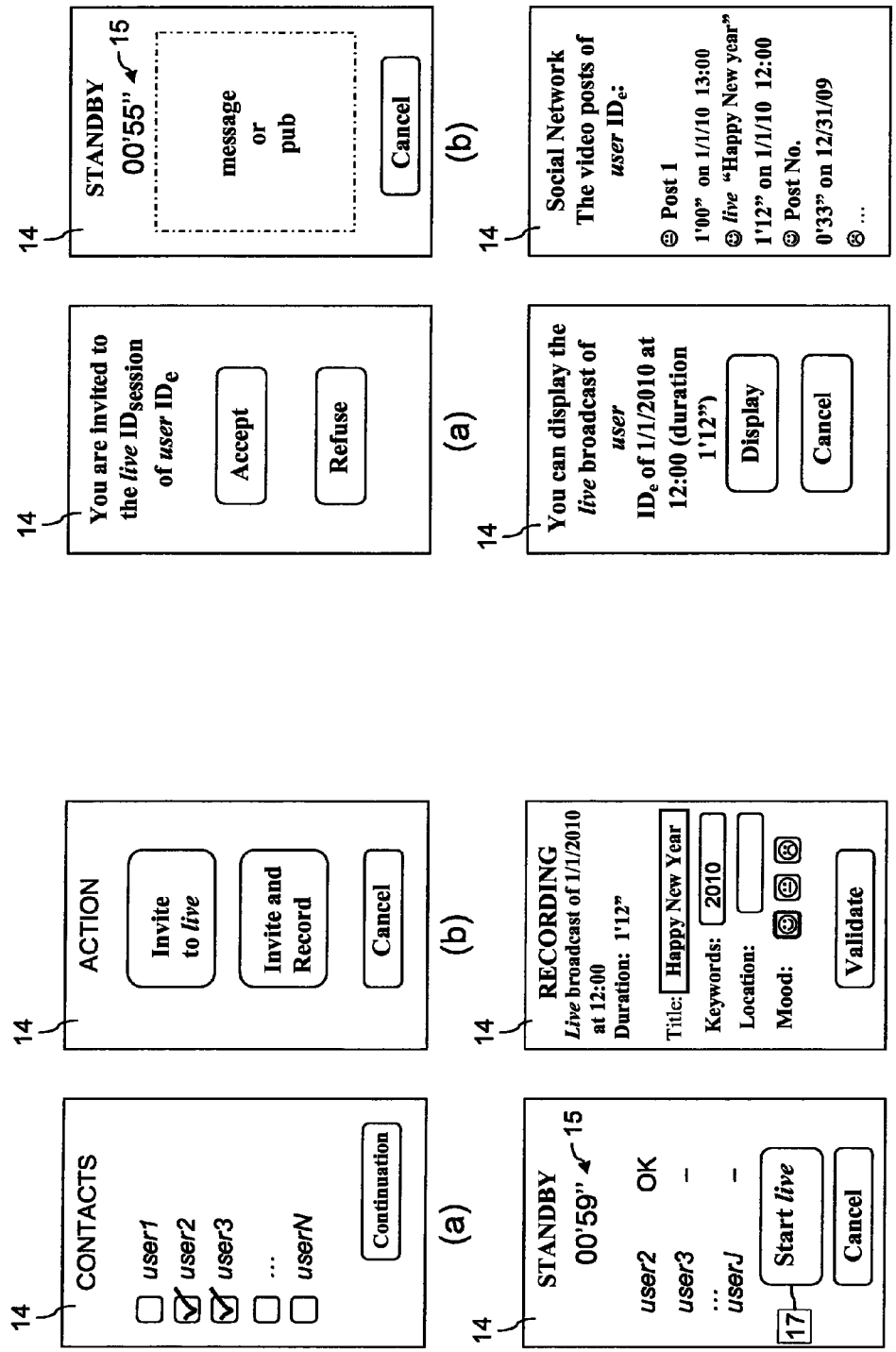

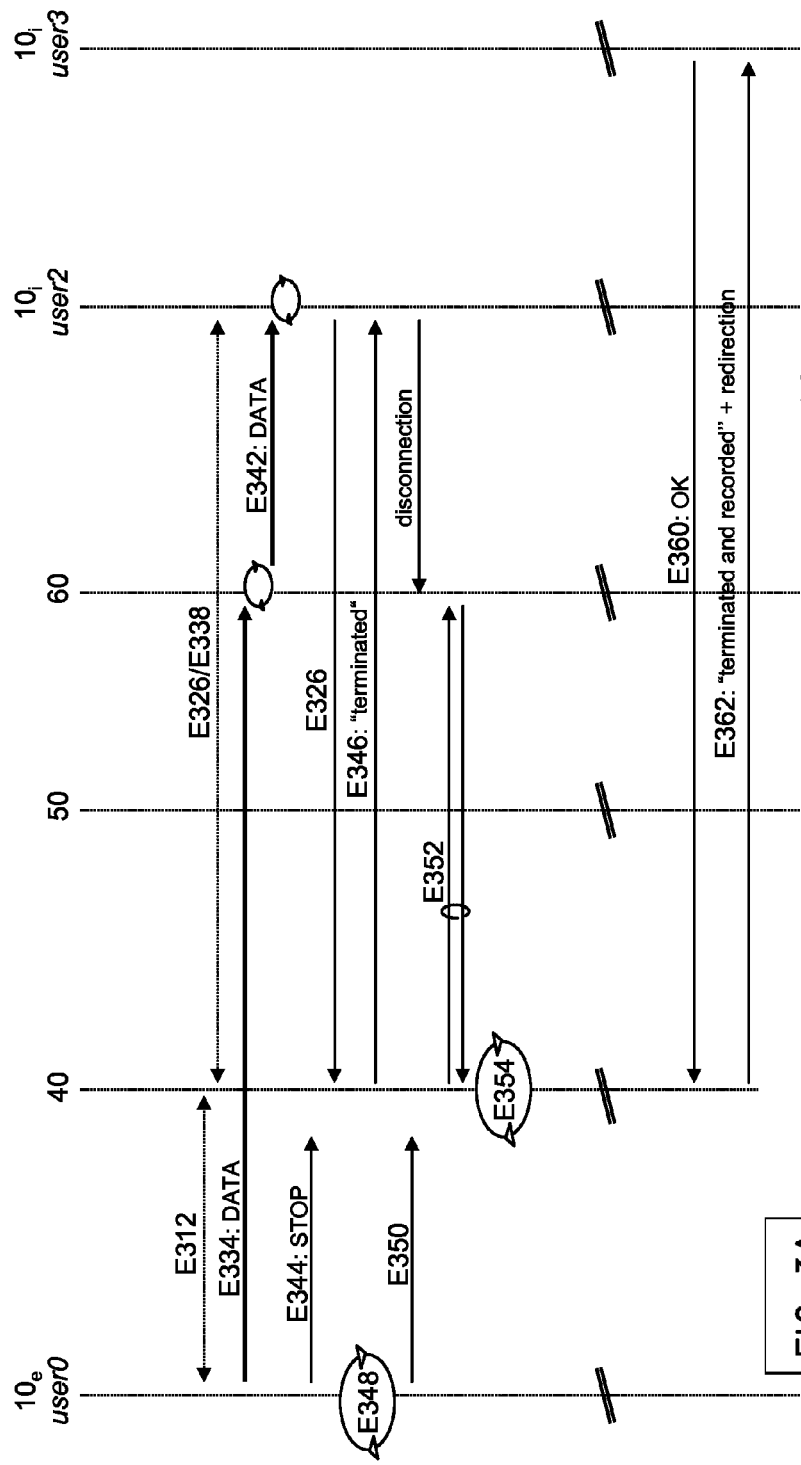

PROCESS AND SYSTEM FOR MANAGEMENT OF A CONTINUOUS BROADCAST SESSION OF A POSTED DIRECT VIDEO STREAM

FIELD OF THE INVENTION

This invention relates to the field of communications and more especially a process and an associated system for managing a continuous broadcast session of a direct video stream between mobile terminals of the mobile telephone network.

BACKGROUND OF THE INVENTION

In the field of communications, current users of electronic terminals are increasingly interested in sharing their experiences directly with other users. It is in this context that social networks have been able to develop, especially Twitter (commercial name) allowing reproduction of written impressions with friends using posts.

The sharing of experiences by continuous broadcasts of direct video sequences (or live streaming) is more complex and is beginning to emerge.

The implementation of such a broadcast, generally of relatively short duration, comprises a broadcast session.

Services such as Qik and Ustream (commercial names) that allow broadcast of a video directly from a mobile phone to the Internet are especially known.

To highlight the possibility of roaming associated with this type of sharing of experiences, however, services such as Knocking (commercial name) have been put into place and henceforth allow the direct broadcast of a video recorded by its own mobile terminal to another mobile terminal (for example, a cell phone, a smart phone or a personal assistant to similar equipment).

A live streaming session is then established as soon as the invited terminal accepts the invitation transmitted by the transmitting terminal. The publication WO 2009/080345 describes, for example, such a session when the two terminals use different communication protocols. In this case, a gateway serves as the intermediary.

The session is conversely terminated as soon as one of the terminals signs off.

This approach, however, has the problem of not allowing establishment of a continuous broadcast session of a direct video stream from a transmitting terminal to the destination of several receiver terminals, whereas the sharing of experiences is generally intended for several users, as shown by the social networks such as Twitter.

However, putting into place solutions that respond to this problem is not without problems of management because of a requirement, in such a context of use, of having to take into account a plurality of invited recipient terminals.

SUMMARY OF THE INVENTION

The invention thus proposes to anticipate these difficulties by using a process for management of a continuous broadcast session of a video stream posted directly on a plurality of terminals connected to a communication network, comprising stages consisting in:

Placing the transmitting terminal in a standby state that is a function of a predetermined synchronization duration, the state during which the transmitting terminal is not transmitting—in said created broadcast session—a direct video stream to the destination of a broadcast server able to receive and continuously multicast a video stream;

Placing the invited terminals having responded in the affirmative to the invitation in a standby state that is synchronized with that of the transmitting terminal;

When the transmitting terminal leaves its standby state to send a direct video stream to the broadcast server, allowing the invited terminals that have responded in the affirmative to the invention to access the broadcast server to receive the continuously broadcast video stream.

The idea of "direct" (or live) is taken in its classic sense for the field of communications, i.e., the video stream is transmitted or broadcast at the same time it is being recorded or created at the level of a transmitting terminal, for display on a plurality of receiver terminals, with at maximum a very slight difference caused by processing or transmission delays. This idea of "direct" is thus opposed to prerecorded and stored video streams.

Since today's mobile terminals are equipped with Internet access, the broadcast server can especially consist in a web server allowing multicasting to a set of terminals connected to it. Moreover, these same terminals are generally equipped with photo and/or video recording means such that they can easily generate a direct video stream.

The invention thus offers a time delay before continuous broadcast of a live session (especially video), which time delay allows the invited users to share the same experience in spite of the delay of certain ones. Moreover, it allows the transmitting user to optionally finalize the preparation of his intervention before he starts the broadcast.

This time delay is obtained, according to the invention, by placing in synchronized standby states, for example via a standby interface, different protagonists of the direct broadcast, whether they be actors or spectators, until said live broadcast is initiated.

It should be noted that the selection of the invited terminals can be managed via an address book of the transmitting user. Such an address book is conventionally stored on a mobile terminal.

In particular, the predetermined duration of the standby state is defined starting from the sending of said invitations. Thus, placing on standby is a function of this duration. The latter is preferably applied similarly to the transmitting user and invited users in order to allow them in fine to share the same experience. It can be on the order of a few seconds to a few minutes, for example one minute.

In making the standby dependent on a predetermined duration, the invention, for example, makes it possible to limit, over time, the waiting of each user; it thus can allow them to be more efficiently organized.

According to one particular characteristic, the process comprises a stage for posting, on an invited terminal or transmitting terminal, a countdown of said predetermined duration. This posting can be implemented through a standby screen on the affected terminals (transmitting terminal and the invited terminals having responded in the affirmative). Thus, knowing exactly the maximum time before the start of the broadcast, the affected user can be so much better organized, for example for the transmitting user in preparing his intervention.

In particular, the process can comprise, during the standby state, posting on the transmitting terminal a status of responses of the invited terminals to said invitation. This allows the transmitting user to adapt his behavior to the evolution of the responses, for example by terminating in an anticipated manner the predetermined duration of the standby, and thus broadcasting the video stream as soon as possible.

Moreover, the invention can provide that the direct transmission of the video stream from the transmitting terminal to the broadcast server and the continuous rebroadcast of said video stream from the broadcast server to said invited terminals are automatically initiated upon the expiration of the predetermined duration. This automatic initiation can be implemented especially if at least one invited terminal has responded favorably to said invitation. This arrangement corresponds to the programming of the broadcast, for example allowing the transmitting user to place himself in position if he wishes to be filmed. For the invited users, this automatic initiation allows them to know in advance (due especially to the aforementioned countdown) the instant of starting of the broadcast, and thus to be concentrated on this broadcast without losing time at the exact instant of said expiration.

According to one particular characteristic, in response to a manual action on said transmitting terminal provided for starting said direct transmission of a video stream, the transmitting terminal leaves the standby state before expiration of said predetermined duration. In the case of such a manual initiation by the transmitting user, it can be provided, of course, that the continuous rebroadcast by the broadcast server is initiated automatically to the invited terminals having responded in the affirmative to the invitations.

This manual action can be performed on a standby screen posted on the transmitting terminal. This manual initiation makes it possible especially to reduce the standby time of the users if, for example, all of the invited users have responded to the invitations.

According to another particular characteristic, the process comprises a stage for transmission of a synchronization signal defining the predetermined duration to said plurality of invited terminals. This transmission can be carried out especially during the sending of the invitations. Moreover, the synchronization signal can be generated by the transmitting terminal or, as a variant, by a central management server from which the invitations and the broadcast session are managed.

This arrangement makes it possible to ensure the simultaneous presence of invited users with the transmitting user for sharing the direct video without a time lag that can prevent certain invitees from being present for the entirety of the direct broadcast.

This synchronization is all the more important as the invention can be integrated into a social network service by video posts where it would be current practice to post brief messages, following the example of the brevity of Twitter messages.

In one embodiment of the invention, the stage consisting in allowing the invited terminals access to the broadcast server, following the start of the broadcast of the direct video stream by the transmitting terminal, comprises the transmission of a broadcast server address on which said video stream is continuously rebroadcast by the broadcast server.

Likewise, it can be provided that the invited terminals having responded in the affirmative to said invitation periodically consult status information of said broadcast session, this information being kept updated by a management server, and that the process comprises, in response to a said consultation of an invited terminal after an initiation of said direct video stream transmission from the transmitting terminal to the broadcast server, a stage for transmission, to said invited terminal, of an access address to the broadcast server in such a way for said invited terminal to access a continuously broadcast video stream.

The status is especially information indicating the state (for example, "not begun," "underway" or "terminated") in which the broadcast session can be found. In this way, the invention communicates the address to which the broadcast direct video stream is accessible as late as possible. This arrangement thus makes it possible to ensure the confidentiality of the broadcast session between the transmitting terminal and invited terminals alone that have responded in the affirmative to the invitation, since especially the communicated address then cannot be broadcast to third parties during the standby period.

In another embodiment, the process comprises stages consisting in:
Recording the continuously broadcast video stream at a storage site accessible by the Internet, and
When the invited terminal responds in the affirmative to said invitation and later at the end of the broadcast session, redirecting said invited terminal to the storage site of said recorded video stream.

The end of the session corresponds especially to the end, for the transmitting terminal, of the video stream transmission to the broadcast server.

This redirection can be done by communicating quite simply the Internet address at which the recorded video is located. It can be implemented all the more often the shorter the broadcast sessions are.

This arrangement is integrated particularly well in a social network context in that the completed recording can comprise a video post that is posted on the account of the transmitting user. In this case, the redirection can redirect the invited latecomer to the page of this social network associated with the transmitting user to display the video to which he has been invited at a later time.

Today's mobile terminals that integrate Internet access easily allow this access to the storage site.

Moreover, it can be provided that the postponing of the direct video stream transmission from the transmitting terminal to the broadcast server comprises posting, on this transmitting terminal, a response status of said invited transmitters to the transmitted invitations. This response status can, for example, consist in indicating if the invitees have accepted, refused or not yet responded to invitations, through some indication means: colored lights, 'OK' or 'KO' comments, etc.

Correlatively, the invention relates to a system for managing a continuous broadcast session of a video stream posted directly on a plurality of terminals connected to a communication network, comprising the following:
A notification module able to send invitations to participate in the broadcast session to a destination of a plurality of terminals that are invited and selected from a transmitting terminal;
A first means for placing on standby that is configured to place the transmitting terminal in a standby state that is a function of a predetermined synchronization duration, a state during which the transmitting terminal does not send, in said created broadcast session, the direct video stream to the destination of a broadcast server able to continuously receive and multicast a video stream;
A second means for placing on standby that is configured for placing the invited terminals that have responded in the affirmative to the invitation in a standby state that is synchronized with that of the transmitting terminal;
A means allowing, when the transmitting terminal leaves its standby state, transmission of a direct video stream to the broadcast server, access—by the invited terminals having responded in the affirmative to said invitation—to the broadcast server for receiving the continuously broadcast video stream.

The system has advantages similar to those of the process explained above. In particular, the means allowing access can be a management server means transmitting to an invited terminal the address at which the video stream can be obtained from the broadcast server.

Optionally, the system can comprise means relating to characteristics of the above-described process.

The invention likewise relates to a machine-readable computer program comprising portions of software code adapted to implementing a procedure according to the invention when it is loaded and executed by the microprocessor.

The computer program has characteristics and advantages that are analogous to the process that it implements.

BRIEF DESCRIPTION OF THE FIGURES

Other features and advantages of the invention will become apparent again in the following description, illustrated by the attached drawings, in which:

FIG. 1 shows one example of a system for implementing the invention;

FIG. 2 shows various screens displayed on a transmitting terminal during implementation of the invention;

FIG. 4 shows various screens displayed on an invited terminal during implementation of the invention.

DETAILED EMBODIMENTS

Figure 3A:
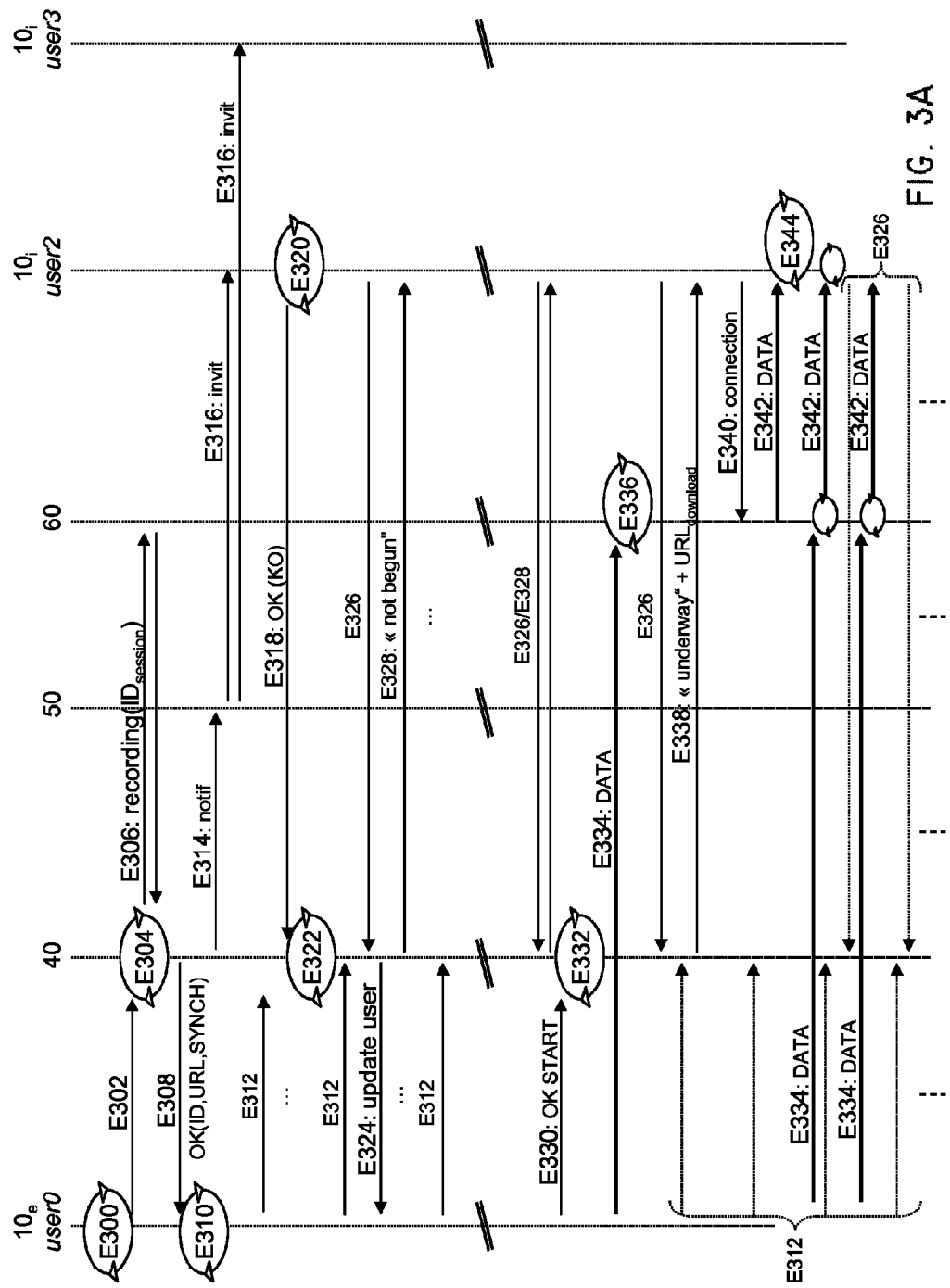
FIG. 3 schematically shows the exchanges between different entities of the system of FIG. 1 during implementation of the invention.

This invention relates to a process for managing a continuous broadcast session of a live video stream transmitted by a mobile transmitting terminal and displayed directly by invited mobile terminals, all connected to a cell phone network. Such a direct and continuous broadcast of a video stream is likewise known under the terminology "live streaming."

With reference to FIG. 1, one example of a system 1 for implementing the invention comprises a plurality of mobile terminals 10 that are connected to a cell phone network 20 supporting packet data transmission, for example a UMTS ("Universal Mobile Telecommunications System") or 3G network.

The mobile terminals 10 are of the conventional type such as cell phones, smart phones or personal assistants using communications means according to a data transfer protocol, for example allowing access to the Internet 30 (the block 32 schematically representing the different devices interconnecting the Internet 30 and the cell phone network 20).

For implementing the invention, each mobile terminal 10 can play the part of a terminal transmitting a live video stream broadcast continuously or the part of a terminal invited to display/post this video stream broadcast by another terminal. To do this, these terminals are equipped with a device for recording images 12 (for example, a photo apparatus or a camera), a display screen 14 and means of keyboarding/selection 16 allowing interaction with functionalities and menus of the terminal 10.

They each, moreover, comprise an application APP for implementing the invention. This application, when it is executed, supports, for example, coding or decoding the video stream, or else communications with a management server 40 or the display of the screens of FIGS. 2 and 4, as described below.

Below, it should be noted that $10_e$ is the transmitting terminal and $10_i$ are the invited terminals.

The system 1 likewise comprises, connected to the cell phone network 20, a broadcast session management server 40, a notification server 50, and a broadcast server 60. These different servers have communication means according to the data transfer protocol that is supported by the network 20. Thus, the terminals 10 and these servers can communicate with one another.

The communications between these servers can pass through the network 20 or can use special connections (dotted lines in the figure) that are provided between each of these servers.

As will be apparent below, the broadcast session management server 40 has as its function to create a broadcast session at the request of a transmitting terminal $10_e$ and to track the state of this session during its lifetime: session not begun, broadcast underway, or terminated.

This management server 40 thus comprises a database 42 that stores the information relative to different streaming live sessions, and in particular:

A session identifier,

A transmitting terminal identifier,

An identifier of each invited terminal as well as the status of the response provided to the corresponding invitation, Date and time information of the session, Status of the session: not begun, underway, terminated, recorded, cancelled, A URL ("Uniform Resource Locator") downloading address for the transmitting terminal, One or more URL reading addresses for the invited terminals, A binary marker indicating if recording of the session must be done, and in this case, complementary information describing this recording.

The notification server 50 has as its function to transmit notifications to different invited terminals depending on the instruction received from the management server 40. These notifications, especially invitations to participate in a broadcast session provided according to the invention, can assume several forms according to the terminals under consideration. For example, Apple Push Notification technology implemented in the Iphone smart phones (commercial name) allows transmission of pushed notifications that can remotely awaken the application APP of the telephone. As a variant, for Android technology (commercial name), notifications of the SMS type can be used. Finally, again as a variant, notifications by e-mail can likewise be envisioned.

The notification server 50 has a database 52 listing the set of terminal identifiers necessary for notification of the terminals and optionally the type of terminal. This is, for example, the case of Iphone telephone identification numbers that are necessary for implementing the Apple Push Notification service. Thus, based on the call number of the user, the identification number of his terminal registered with this server is recovered; this allows a notification to be formed, if necessary.

The broadcast server 60 is a broadcast server of the Yacast (commercial name) server type equipped with a multicast module of the Wowza type (commercial name). It is thus able to receive a video stream transmitted directly by a transmitting terminal and to multicast continuously and without delay (thus remaining direct) this received stream to several destination terminals by dispatching the received video stream to several URL retransmission addresses.

The functionalities of these different servers can, however, be implemented within the same devices or distributed on any number of devices. For reasons of clarity, three distinct servers will be maintained below.

Moreover, although in this example these servers are designed to be connected to the cell phone network 20, all or some of them can be connected to the Internet 30. Since the terminals 10 are provided with Internet access means, the communications described below with the servers 40, 50, and 60 can likewise be implemented for servers connected to the Internet.

Now, with reference to FIGS. 2, 3 and 4, the management of a direct broadcast session between the terminals is accomplished as follows.

A user desiring to transmit a continuous live video stream starts his dedicated application APP on his terminal $10_e$. This application can be a service to which he has subscribed and which he accesses from then on by entering a personal identifier and a password.

FIG. 2a shows a screen of the application obtained when the user $10_e$ chooses a live broadcast function in the application. This screen displays especially the set of contacts of his notebook of contacts or his account in the service to which he has subscribed, for example, by name. If necessary, only the contacts having likewise on their terminals the application APP allowing the implementation of the invention are displayed by filtering (whereby this information can be recovered by request of the management server 40 listing all the terminals registered in the service).

Via this screen, the user chooses the contacts he wishes to invite to his live stream, here the users user2 and user3. The number of contacts that can be invited can be very limited, for example to 10, especially depending on technical considerations at the level of the broadcast server 60.

Following this selection, the user specifies that he wishes solely to initiate the live session or likewise wishes that the live session be recorded and subsequently made available (FIG. 2b).

This recording can be likewise integrated into a social network service housed by a web server 34.

By way of example, this social network service comprises a set of subscribers each having a personal page on which each subscriber makes video posts, by way of example the posts written on the Twitter network (commercial name). Thus, a user 36 of the Internet 30 can access these video posts.

These video posts can consist especially in a short video sequence with which a title, time and date data as well as a mood (for example, an icon) and optionally other information (keywords, location information, etc.) are associated.

As will be described below, the live recording implemented by the transmitting user $10_e$ is stored at the level of his page in this social network service, on the server 34. The server 34 can especially be part of the server 40 when the latter is integrated into the Internet.

The screens of FIGS. 2a and 2b correspond to an initial stage E300 (FIG. 3) for selection of several invited terminals by the transmitting terminal, which results in the transmission of a request to create a live session with the management server 40 (stage E302).

This request comprises the following: the identifier $ID_e$ of the transmitting terminal and the identifiers $ID_i$ (IMSI numbers, for example—International Mobile Subscriber Identity, or identifiers of the users in the service that is subscribed and implemented by the application APP) of the invited terminals selected during stage E300, as well as the indication of a recording or not of the live session, and optionally the duration of the live broadcast that the user $10_e$ can specify.

Upon receipt of this request, the management server 40 generates (stage E304) a unique session identifier $ID_{session}$ and synchronization information SYNCH in the form of a time label, and then it obtains an upload address $URL_{upload}$ at the broadcast server 60.

This synchronization information SYNCH can, for example, indicate 60 seconds, which, added to the present moment, represents the instant of starting of the direct session, as will be seen below.

To obtain this address, the management server 40 sends to the broadcast server 60 a request E306 identifying the created session ($D_{session}$) and indicating, if necessary, if a recording of this session is to be provided.

This uploading address, in the form of the URL, is designed to be used by the transmitting terminal $10_e$ for broadcasting its direct video stream before remulticast to the invited terminals.

The broadcast server 60 likewise communicates the $URL_{download}$ address or addresses for rebroadcast of the video stream that will be used by the invited terminals to receive this video stream. It likewise safeguards the information according to which it will have to initiate the recording of the session $ID_{session}$ starting with reception of a video stream at the communicated $URL_{upload}$ address.

These generated and obtained data are stored, with the parameters of the received request, in the base 42 of the management server.

In response to the request E302, the management server 40 returns a message E308 to the transmitting terminal, indicating to it the identifier of the created session $ID_{session}$, synchronization information SYNCH, and the uploading address $URL_{upload}$.

Upon receipt of this response, the transmitting terminal $10_e$ recovers this information and switches (stage E310) into a standby state in which its screen lists, on the one hand, the different invited users and their status of response to the invitation (at this instant, all of the statuses are "not responded," here by display of a dash) and indicates, on the other hand, a countdown 15 based on the received synchronization information SYNCH, for example of one minute (FIG. 3c).

Since the transmitting terminal $10_e$ has not received responses to its invitations, the direct video stream transmission to the broadcast server 60 using the $URL_{upload}$ address is placed on standby.

The application APP executed on the terminal $10_e$ ensures that the countdown 15 of the time lag is periodically refreshed on the screen.

Moreover, a "start live" button 17 optionally makes it possible for the user to manually start the broadcast in advance relative to the SYNCH time lag, as soon as at least one invited user has agreed to participate in the live session.

Starting from this instant, the transmitting terminal $10_e$ periodically transmits requests to track the response state of the different invited terminals $10_i$ to the invitations at the management server 40 (stages E312). By way of example, a request can be transmitted every second.

In parallel, the management server 40 sends a request E314 to the notification server 50 in order for the latter to "invite" the selected users during stage E300. This request thus contains the identifier of the session $ID_{session}$, the identifiers $ID_i$ of the invited users, and the synchronization information SYNCH, as well as optionally the type of terminal for each of the invited users.

The type of terminals can be stored especially in a general base by the management server 40 as the various user connections to the service are established. As a variant, it can be specified by these users during their subscription to the service. Finally, it can be known from the server 50 by recording this information in the base 52 during storage of the terminal identifiers necessary for their notification.

Using these data and the base 52, the notification server (E316) sends an invitation to each of the invited terminals $10_i$ by SMS, e-mail, or by using the Apple Push Notification service according to the type of terminal involved. These invitations comprise the session identifier, the synchronization information SYNCH, and optionally the identifier $ID_e$ of the transmitting user.

Since these stages E314 and E316 are relatively fast and are parallel to stage E308, the synchronization information is thus received essentially at the same time by the different invited terminals $10_i$ and transmitting terminal $10_e$. This therefore results in sufficient synchronization of these terminals, as seen below, to allow good development of the broadcast session.

Actually, the passage of a few tens or 100ths of seconds does not adversely affect a direct broadcast session.

FIG. 4a shows one example of an invitation screen.

When an invited user responds to this invitation screen (let us take the case in which user2 responds in the affirmative), an OK response is transmitted to the management server (E318).

The invited terminal $10_i$ of user2 in turn switches into a standby state by display of a standby screen on which the countdown synchronized with the SYNCHRO information likewise appears (stage E320 and FIG. 4b).

At this stage, access to the broadcast server 60 to obtain the video of the session is not yet implemented. In other words, the rebroadcast continues and the direct video stream that must be transmitted by the transmitting terminal is likewise placed on standby.

A standby message (defined by the transmitting user, by the application, or even an advertisement) can likewise be displayed on the standby screen, as well as a cancel button that—if it is selected—sends a new response E318 indicating "KO" this time.

Upon receipt of a response from an invited terminal, the management server updates its database 42 by specifying, for the invited terminal having responded, the state of its response (stage E322).

Thus, upon the next request E312 of the transmitting terminal $10_e$, the management server 40 returns the response of the user user2 to the invitation, here an affirmative response (E324). The receipt of this response especially makes it possible to update the standby screen of FIG. 2c to indicate there that the user user2 is "OK."

On the side of the user user2, following stage E320, the invited terminal $10_i$ periodically transmits the requests to track the live session status at the management server 40 (stages E326). By way of example, a request can be transmitted every second.

It should be noted that if the management server 40 ceases to receive these periodic requests from an invited terminal, it deduces from it that the terminal has terminated the application and automatically updates its response status, in passing it to "KO." If it stops receiving the periodic requests E312 from the transmitting terminal, it conversely ends the session and indicates a status "session cancelled" in the base 42.

At this stage, the responses of the management server to the requests E326 indicate to all "session not begun" (E328); this leads to keeping the display of the standby screen on the invited terminals $10_i$ with, however, one refreshing of the countdown 15.

Then, the instant at which the transmitting terminal $10_e$ finally decides to start the direct broadcast comes. This instant can result from the expiration of the SYNCH time lag (countdown 15 that arrives at 0) with or without confirmation by the transmitting user, or manual starting of the broadcast using the button 17. This initiation of the broadcast can likewise be automatically initiated as soon as all of the invited users have responded, regardless of the responses as long as at least one user has agreed to participate in the broadcast session.

In this case, the transmitting terminal $10_e$ transmits to the management server 40 an update message of the session status by indicating that it is starting (stage E330).

The management server 40 then updates the session status information to "underway" (E332) in its base 42.

The transmitting terminal $10_e$ is then connected to the broadcast server 60 at the $URL_{upload}$ address that has already been communicated to it, and then starts the continuous and direct transmission of a video stream FV by transmission of video data in packet mode (stages E334). It continues, however, to transmit periodic requests E312 to the management server 40 in order especially to detect the extreme case in which all of the invited users leave the session, for which case it will be possible to automatically end the session.

The video stream FV is especially created by recording a video sequence using a recorder 12 and a microphone, and then by compression/coding in a coding format by the onboard application APP. In the case of an Iphone (commercial name)—type terminal, this video can be constructed by periodically recording (every $\frac{1}{15}$ s, for example) photo images using an integrated photo apparatus, and using them as an image sequence.

One example of a coding format adapted to the domain of mobile telephony is the Sorenson Spark (commercial name) format for the video part and the Nelly Moser (commercial name) format for the audio part. Of course, other formats can be implemented within the framework of this invention.

The implementation of coding/decoding by the application APP at the terminal level makes it possible to improve the performance of the management server 40.

To allow efficient transmission of these video and audio data on the network 20, they are, moreover, encapsulated in FLV-type containers.

The transmission of the data of the video stream FV to the broadcast server 60 is then performed using a streaming protocol such as the RTMP ("Real Time Messaging Protocol") protocol.

According to the choice made during stage E300 by the transmitting user, the data that have been received in this way are recorded locally by the broadcast server 60 (stage E336) on the fly when they arrive, or not.

From the first request E326 of the user user2 following the start E330 of the broadcast by the transmitting terminal $10_e$, the management server 40 indicates to the invited terminal of the user user2 that the session is "underway" and provides a rebroadcast address $URL_{download}$ to which it can connect (stage E338).

From this instant, the invited terminal $10_i$ connects to the address $URL_{download}$ of the broadcast server 60 (E340) to access the broadcast video stream, while continuing its periodic requests E326.

As specified above, the broadcast server 60 is provided for rebroadcasting the video stream FV that is received continuously and without delay (real time) from the transmitting terminal. This can be a remulticast to the various invited terminals, as soon as the latter connect to it via the addresses URL$_{download}$ that have been reserved. The rebroadcast is likewise carried out using a streaming protocol such as the RTMP protocol.

The invited terminal $10_i$ then receives (E342) the data that have been retransmitted continuously and directly by the broadcast server. After de-encapsulation and decompression of these data, the application APP thus posts the video stream directly (E344) on the screen of the user user2.

Any invited user who responds to the invitation E316 while the broadcast is underway sees displayed that the session is "underway" and sees displayed an address URL$_{download}$ for access to the broadcast server 60.

As soon as the transmitting terminal ends the transmission of the data of the video stream (for example, by voluntarily stopping the broadcast or by expiration of a predetermined time of the live broadcast), an updating message indicating that the session is "terminated" is sent (E344) to the management server 40 that updates its database 42.

Thus, in response to any subsequent request E326, the management server 40 indicates (E346) to the invited terminals that the session is "terminated," leading the latter to end their connection to the broadcast server 60.

In the case in which a recording has been requested, the end of the session starts the posting of the recording confirmation screen from FIG. 2d, picking up the information on the video stream that has just been recorded (date and time as well as the duration) and allowing the collection of complementary information (metadata: title, location data, keywords or else information representative of a mood, for example using icons, etc.).

The transmitting user thus completes this screen that he validates (E348) by generating a message E350 to the destination of the management server 40.

These data are stored in the memory 42, and then the management server 40 recovers (E352) the recording at the broadcast server so as to store it on the server 34 and to indicate there the metadata added by the user (E354). This storage can be done in particular in association with the user account of the transmitting user so that the recording of the live session constitutes a new video post to his account of the social network site.

At the end of the session in the case of recording, it can be proposed to the invited users who have participated in the session that the web page of the transmitting user containing this new video post be accessed.

If subsequent to the end of the broadcast session, the invited terminal of the user user3 responds in the affirmative (stage E360), the management server 40 indicates, in response E362, that the session is "terminated and recorded" and provides to the invited terminal user3 a redirection address to the thus posted video post. The user user3 not having been present for the direct broadcast can thus display the video stream FV.

FIGS. 2c and 2d show two examples of a screen that can be displayed on the invited terminal user3 in this case, one indicating the existence of the video post and proposing response to it (FIG. 2c) and the other switching automatically to the transmitting user page on the social network site, this page including especially the video post on which the user user3 can click to display it (FIG. 2d).

The aforementioned examples are only embodiments of the invention that are not limited thereto.

Of course, the cancellation actions have not been described in detail above, but as shown in the different figures, "cancel" buttons are provided to allow the user to terminate an action (in the session for the transmitting user, to participate in the session for an invited user, to confirm the recording of the session, etc.). One skilled in the art will not have any difficulty, in view of the aforementioned description, in adapting the corresponding different stages (updating of the base 42 and responses to requests E312 or E326 for notification of cancellations).

Moreover, the connection to the servers 40 and 60 from a user 36 of the Internet 30 does not raise the major difficulty, the mobile-to-web technologies being known to one skilled in the art. Thus, the direct and continuous session of broadcasting a video stream according to the invention can likewise be accessible from the post 36 of the Internet.

This can be the case, for example, if a contact invited by the transmitting user is invited by e-mail.

The invention claimed is:

1. A process for management of a continuous broadcast session of a video stream posted directly on a plurality of terminals connected to a communication network, comprising:
    sending invitations to participate in the broadcast session to a destination of a plurality of terminals selected and invited from a transmitting terminal,
    placing the transmitting terminal in a standby state that is a function of a predetermined synchronization duration, the state during which the transmitting terminal is not transmitting, in a created broadcast session, a direct video stream to the destination of a broadcast server able to receive and continuously multicast a video stream, wherein the predetermined synchronization duration of the standby state is defined only from the sending of said invitations;
    placing the invited terminals that have responded in the affirmative to the invitation in a standby state that is synchronized with that of the transmitting terminal;
    when the transmitting terminal leaves its standby state to send a direct video stream to the broadcast server, allowing the invited terminals that have responded in the affirmative to the invitation to access the broadcast server to receive the continuously broadcast video stream;
    wherein the invited terminals that have responded in the affirmative to said invitation periodically consult status information of said broadcast session, this information being kept updated by a management server, and the process comprises in response to a-said consultation of an invited terminal after starting said direct video stream transmission from the transmitting terminal to the broadcast server, a stage of transmission, to said invited terminal, of an access address to the broadcast server in such a way that said invited terminal can access the continuously broadcast video stream; and
    wherein, if the management server ceases to receive periodic status requests from an invited terminal, it deduces from this that the terminal has terminated the broadcast session and automatically updates its response status.

2. A process according to claim 1, comprising a posting stage of a countdown of said predetermined synchronization duration on an invited or transmitting terminal.

3. A process according to claim 2, comprising, during the standby state, posting on the transmitting terminal of a status of responses of the invited terminals to said invitation.

4. A process according to claim 1, wherein the sending of a direct video stream from the transmitting terminal to the broadcast server and the continuous broadcast of said video stream from the broadcast server to said invited terminals are automatically initiated upon the expiration of the predetermined synchronization duration.

5. A process according to claim 1, wherein in response to a manual action on said transmitting terminal provided for starting said direct transmission of a video stream, the transmitting terminal leaves the standby state before expiration of said predetermined synchronization duration.

6. A process according to claim 1, comprising a stage for transmission to said plurality of invited terminals of a synchronization signal defining the predetermined synchronization duration.

7. A process according to claim 1, wherein the stage consisting in allowing the invited terminals access to the broadcast server comprises, following the start of the broadcast of the direct video stream by the transmitting terminal, the transmission of a broadcast server address on which said video stream is continuously rebroadcast by the broadcast server.

8. A process according to claim 1, comprising:
recording the continuously broadcast video stream in a storage site that is accessible by the Internet, and
when an invited terminal responds in the affirmative to said invitation and later at the end of the broadcast session, redirecting said invited terminal to the storage site of said recorded video stream.

9. A non-transitory computer-readable medium comprising instructions for implementing a management process according to claim 1, when said instructions are executed by a microprocessor.

10. A system for managing a continuous broadcast session of a video stream posted directly on a plurality of terminals connected to a communication network, comprising:
a notification module able to send invitations to participate in the broadcast session to a destination of a plurality of invited and selected terminals from a transmitting terminal;
a first means of placing on standby that is configured to place the transmitting terminal in the standby state that is a function of a predetermined synchronization duration, a state during which the transmitting terminal does not send, in a created broadcast session, the direct video stream to the destination of a broadcast server able to continuously receive and multicast a video stream, wherein the predetermined synchronization duration of the standby state is defined only from the sending of said invitations;
a second means for placing on standby that is configured for placing the invited terminals having responded in the affirmative to the invitation in a standby state that is synchronized with that of the transmitting terminal;
a management server which keeps updated a status information of the broadcast session, and sends periodically the information to the invited terminals that have responded in the affirmative to the invitation and that consults status information of the broadcast session; and
a means
allowing, when the transmitting terminal leaves its standby state to transmit a direct video stream to the broadcast server, access, by the invited terminals that have responded in the affirmative to said invitation, to the broadcast server to receive the continuously broadcast video stream, and
transmitting in response to a consultation of an invited terminal after starting said direct video stream transmission from the transmitting terminal to the broadcast server, to said invited terminal, of an access address to the broadcast server in such a way that said invited terminal can access the continuously broadcast video stream; and
deducing, if the management server ceases to receive periodic status requests from an invited terminal, that the terminal has terminated the broadcast session and automatically updating its response status.

11. A system for managing a continuous broadcast session of a video stream posted directly on a plurality of terminals connected to a communication network, comprising:
a notification module able to send invitations to participate in the broadcast session to a destination of a plurality of invited and selected terminals from a transmitting terminal;
a component configured to place on standby that is configured to place the transmitting terminal in the standby state that is a function of a predetermined synchronization duration, a state during which the transmitting terminal does not send, in a created broadcast session, the direct video stream to the destination of a broadcast server able to continuously receive and multicast a video stream, wherein the predetermined synchronization duration of the standby state is defined only from the sending of said invitations;
a component configured to place the invited terminals having responded in the affirmative to the invitation in a standby state that is synchronized with that of the transmitting terminal;
a management server which keeps updated a status information of the broadcast session, and sends periodically the information to the invited terminals that have responded in the affirmative to the invitation and that consults status information of the broadcast session; and
a component configured to
allow, when the transmitting terminal leaves its standby state to transmit a direct video stream to the broadcast server, access, by the invited terminals that have responded in the affirmative to said invitation, to the broadcast server to receive the continuously broadcast video stream, and
transmit, in response to a consultation of an invited terminal after starting said direct video stream transmission from the transmitting terminal to the broadcast server, to said invited terminal, an access address to the broadcast server in such a way that said invited terminal can access the continuously broadcast video stream; and
deduce, if the management server ceases to receive periodic status requests from an invited terminal, that the terminal has terminated the broadcast session and automatically updating its response status.

* * * * *